United States Patent [19]

Sonenstein

[11] Patent Number: 4,481,326

[45] Date of Patent: Nov. 6, 1984

[54] WATER SOLUBLE FILMS OF POLYVINYL ALCOHOL POLYVINYL PYRROLIDONE

[75] Inventor: Gerard G. Sonenstein, Piscataway, N.J.

[73] Assignee: Colgate Palmolive Company, New York, N.Y.

[21] Appl. No.: 517,486

[22] Filed: Jul. 26, 1983

Related U.S. Application Data

[63] Continuation of Ser. No. 414,692, Sep. 3, 1982, abandoned, which is a continuation of Ser. No. 300,315, Sep. 8, 1981, abandoned, which is a continuation of Ser. No. 216,231, Dec. 15, 1980, abandoned.

[51] Int. Cl.$^3$ ............... C08L 29/04; C08L 39/06
[52] U.S. Cl. ................................. 524/377; 525/57
[58] Field of Search ..................... 525/57; 524/377

[56] References Cited

U.S. PATENT DOCUMENTS 3,892,905  7/1975  Albert .............................. 525/57
3,997,489 12/1976  Coker .............................. 525/57

Primary Examiner—Carman J. Seccuro
Attorney, Agent, or Firm—Herbert S. Sylvester; Murray M. Grill; Norman Blumenkopf

[57] ABSTRACT

Films which are rapidly soluble in cold and warm water are formed from blends of water soluble polyvinyl alcohol (partially hydrolyzed polyvinyl acetate) and polyvinyl pyrrolidone. The polymers are compatible and form homogeneous mixtures from which clear, transparent, non-tacky, easily handleable, mechanically strong films can be formed. The films are stable at both low and high humidity conditions, i.e., the films do not become brittle or tacky and retain their high rates of dissolution in water even after being stored in low or high humidity environments at both high and low temperatures. Further, improvements are achieved by incorporating a plasticizer into the polymer blend. The films are also heat sealable and biodegradable.

6 Claims, No Drawings

WATER SOLUBLE FILMS OF POLYVINYL ALCOHOL POLYVINYL PYRROLIDONE

This is a continuation of application Ser. No. 414,692 filed Sept. 3, 1982 which in turn is a continuation of application Ser. No. 300,315 filed 9/8/81 which in turn is a continuation of application Ser. No. 216,231 filed 12/15/80 all now abandoned.

BACKGROUND OF THE INVENTION (1) Field of the Invention

This invention relates to water soluble films. More particularly, this invention relates to water soluble films useful in packaging applications, especially for dry detergents and similar water soluble commodities, formed from homogeneous blends of water soluble polyvinyl alcohol and polyvinyl pyrrolidone.

(2) Discussion of the Prior Art

Packaging materials formed from film-forming materials which are water soluble have been used for many years for packaging water soluble or dispersible dry, solid materials which may be toxic or otherwise harmful to the user or which may be difficult to weigh out in accurate portions, or simply for the convenience of the user. Examples of typical materials used in aqueous environments which have been packaged or proposed for packaging in water soluble films include, for example, cleaning products, such as laundry detergents, bleaches, and caustic cleansers; pesticides, such as herbicides, fungicides, insecticides, and nematocides which are applied as aqueous sprays; and various other pulverulent water soluble or dispersible chemicals, such as carbon black, pigments, dyes, etc; food products, and the like.

One of the most widely investigated water soluble film-forming materials used or promoted for packaging of such powdery materials is polyvinyl alcohol (i.e., partially hydrolyzed polyvinyl acetate). At hydrolysis levels of up to about 97-99%, polyvinyl alcohol is soluble in water although the rates of dissolution are too slow to be practical, especially in cold water.

Many attempts have been reported in the patent literature to improve upon the properties of water-soluble polyvinyl alcohol packaging films. These efforts have included, for example, selection of special plasticizers, e.g., U.S. Pat. No. 2,948,697—J. A. Robertson and U.S. Pat. No. 3,106,543—J. N. Milne, assigned to E. I. duPont de Nemours; U.S. Pat. Nos. 3,157,611—M. K. Lindemann, assigned to Air Reduction Co.; U.S. Pat. No. 3,374,195—T. S. Bianco, et al., assigned to Mono-Sol Div. of Baldwin-Montrose Chemical Co.; modification or copolymerization of the polyvinyl alcohol, e.g., U.S. Pat. No. 3,300,546—R. L. Baechtold, assigned to American Cyanamid, U.S. Pat. Nos. 3,441,547 and 3,505,303—M. K. Lindemann, assigned to Air Reduction Co., U.S. Pat. No. 3,277,009—M. Freifeld, et al., assigned to General Airline & Film Corp.; and blending polyvinyl alcohol with other polymers, e.g., U.S. Pat. No. 2,850,541—I. M. Klein, U.S. Pat. Nos. 3,695,989 and 3,892,905—R. E. Albert, assigned to E. I. duPont de Nemours.

The Albert Pat. No. 3,695,989 describes cold water soluble packages made from foamed films of polyvinyl alcohol, polyvinyl pyrrolidone or mixtures thereof which films have dispersed therein from 80 to 99% of the total volume of the film of gas bubbles having an average diameter less than ⅓ of the total thickness of the film. The polymers are of high molecular weight, e.g., above about 80,000 in order to obtain flexible packages which can dissolve rapidly in cold water.

In U.S. Pat. No. 3,892,905, Albert describes cold water soluble plastic films formed from a mixture of polyvinyl alcohol and polyvinyl pyrrolidone wherein one of the polymers has a molecular weight average of more than 120,000 and the other has a molecular weight average of less than 90,000.

However, none of these efforts have been entirely satisfactory in providing films which are sufficiently stable against degradation of physical properties when stored under relatively low humidity/low temperature or relatively high humidity/high temperature conditions. Thus, at low humidity/low temperature conditions, many of the films become brittle and lose elasticity, resulting in loss of impact resistance and tear strength. They may also lose their clarity and heat sealability. At high humidity/high temperature conditions (e.g., 100° F. and 80% R.H.) the degree of hydrolysis of the polyvinyl alcohol may increase to levels at which the polyvinyl alcohol is no longer water soluble or the film may simply become too soft and tacky to be stored or handled. The films may become water insoluble after only 2 weeks at these conditions. For this reason, it is usually necessary to store the films under specially controlled atmospheric conditions or to provide special waterproof protective release films between plies of the water soluble polyvinyl alcohol films, as shown, for example, in Albert—U.S. Pat. No. 3,892,905, at col. 3, line 47-col. 4, line 4 and col. 4, lines 44-54. Many of the prior art films suffer from poor aging stability when in contact with alkaline substances, even under moderate (e.g., 50% R.H.) humidity conditions. For example, they may become water insoluble after only 2 to 3 weeks.

Polyvinyl alcohol is not fully compatible with most polymers and, therefore, does not form completely homogeneous blends and, accordingly, it is difficult to form uniformly transparent and mechanically strong films. Still further, the prior art films do not have sufficiently high rates of dissolution in water, particularly cold water, i.e., at water temperatures below about 60° F., especially at or near ice water conditions.

SUMMARY OF THE INVENTION

Accordingly, it is an object of this invention to provide water soluble films, useful for packaging applications, which have high rates of solubility in both cold and hot water.

It is a further object to provide water soluble films which are insensitive to humidity, e.g., which do not become insoluble at high relative humidity and high temperature storage conditions.

A further object of the invention is to provide water soluble films which are clear, transparent, non-tacky, easily handleable, heat sealable, and mechanically strong and which are inexpensive to produce.

These and other objects of the invention can be accomplished by water soluble films formed from homogeneous blends of water soluble polyvinyl alcohol and polyvinyl pyrrolidone wherein both polymers are characterized by having a weight average molecular weight in the range of about 10,000 to 50,000. Generally, the polymers are blended at weight ratios (on a dry solids basis) of polyvinyl alcohol to polyvinyl pyrrolidone in the range of from about 10:1 to 1:1. The polyvinyl alcohol is a partially hydrolyzed polyvinyl acetate having a degree of hydrolysis of less than about 96%.

Small amounts of plasticizers to lower the glass transition temperature, tg, and brittle temperature, tf, and nonionic anti-foaming agent to suppress foaming during film formation are desireably included in the polymer blend. In addition, in view of the biodegradability of the water soluble films, a biocide can be included in the film-casting solutions with the polymers and other adjuvants.

DETAILED DESCRIPTION OF THE INVENTION

The water soluble films of this invention are especially suitable for packaging pulverulent or powdery or other solid dry materials which are to be dissolved or suspended in aqueous solutions for use. These films are useful for packaging any dry commodities where rapid water solubility, including ice water temperatures, is required and especially where continued stability to aging at high and low temperatures and humidities and good strength are required. For example, a premeasured quantity of a powdery laundry detergent can be stored in a sealed bag made from the water soluble films and simply dropped into the washing machine. The film package will rapidly dissolve upon coming into contact with the wash water to release the detergent. There is no residue from the bag which could clog pipes, valves or other components of the washing machine or other apparatus with which the films are used. The polymer materials are also biodegradable and therefore do not pose any environmental pollution problems.

The films can be simply prepared by forming an aqueous solution of the polyvinyl alcohol and polyvinyl pyrrolidone and laying down the solution on a smooth casting surface. A doctor's blade or other means can be used to obtain the desired film thickness. Upon evaporation of the aqueous solvent, a clear transparent and uniformly thin film of the polymer blend is left which can be easily stripped from the casting surface.

The casting surface can be any smooth, hard material such as steel, aluminum, glass or polymer, e.g., polyolefin, polyester, polyamide, polyvinyl chloride, polycarbonate, polyhalocarbons, etc. The rate of evaporation of the aqueous solvent can be increased by heating the casting surface or by exposing the deposited coating solution to, for example, heated air or infrared rays. The casting surface may be flat or the films may be made on standard (drum type) industrial film casting machinery followed, for example, by oven drying.

The aqueous coating or casting solution can be formed by any desired means. For example, the polyvinyl alcohol can first be dissolved in water and the polyvinyl pyrrolidone added to this solution.

The polyvinyl alcohol can be added to a solution of polyvinyl pyrrolidone. Alternatively, the two polymers can first be blended together and then added to water. The choice of any particular method will generally be dictated by the form of the commerical source of the respective polymers.

However, it has been found that with typical commercially available granular, partially hydrolyzed polyvinyl alcohol, the best results are achieved by preparing the polymer blend casting solution by first dissolving the granules in water by a two-step procedure: adding the granules to cold to room temperature or warm water to form a dispersion, and then heating the solution at an elevated temperature in the range of about 150° F. to 250° F., preferably 180° F. to 200° F., with vigorous agitation. To prevent foaming with possible occlusion of air bubbles in the cast film, an anti-foam agent is preferably added to the solution before raising the temperature and agitating.

Any anti-foam agent which will not adversely effect the water-solubility of the film can be used. Non-ionic surfactants are useful anti-foam agents. For example, the polyalkylene oxide condensates of alkylphenols and alkylene oxide condensates with a hydrophobic base are suitable classes of nonionic surfactants. As typical examples of the former class, mention can be made of the condensation products of alkyl phenols having an alkyl group containing from about 6 to 12 carbon atoms in either a straight chain or branched chain configuration, with about 5 to 25 moles of ethylene oxide per mol of alkyl phenol. A typical example of the latter class is a condensation product of ethylene oxide and/or propylene oxide with propylene glycol.

The water soluble condensation products of aliphatic alcohols having from 8 to 22 carbon atoms, in either straight chain or branched chain configuration, with alkylene oxide, e g., a coconut alcohol-ethylene oxide condensate having from about 5 to about 30 mols of ethylene oxide per mol of coconut alcohol (e.g., $C_{10}$-$C_{14}$ alcohol fraction), are also useful nonionic surfactant anti-forming agents.

Specific examples of non-ionic anti-foaming agents include ethoxylated octyl and nonyl phenol containing 5 to 12 mols ethylene oxide and available commercially under such tradenames as Triton CF-32, Triton X-100, Triton X-45, Stearox DJ, and Igepal; and the polyoxyalkylene alcohols such as those sold commercially under the Pluronic trademark.

In addition, the silicone emulsion anti-foaming agents, such as Antifoam AF, and others, available from Dow Chemical Company, can be used.

The amount of the anti-foam agent is not especially critical and generally only that amount which is effective to suppress foaming of the polyvinyl alcohol during the preparation of the film casting solution will be used. Amounts in the range of from about 0.005 to 1.0%, preferably from about 0.05 to 0.5% by weight, based on polyvinyl alcohol solids, is satisfactory. For example, with Triton CF-32, about 0.1% of anti-foam agent is sufficient.

The solid loading content of the aqueous coating solution will be selected based on the desired viscosity and on the desired film thickness. Generally, solid contents in the range of from about 5% to about 30%, preferably from about 8% to about 20%, more preferably from about 10% to about 15%, and film thicknesses in the range of from about 0.0005 to about 0.010 inch, preferably from about 0.001 to about 0.005, more preferably from about 0.001 to about 0.002, are satisfactory. Naturally, it is preferable to minimize the amount of solvent as much as possible so that the time required for drying the deposited film will be minimized.

Any of the commercially available forms of water soluble (i.e., partially hydrolyzed) polyvinyl alcohol are suitable for use in the invention. Generally, degrees of hydrolysis wherein 99% or more of the acetate groups of polyvinyl acetate are replaced by hydroxyl groups are not water soluble, while above 96% hydrolysis, the rates of solubility may be too low or solubility in cold water may be impaired. On the other hand, at hydrolysis levels below about 85%, especially below about 79%, the polyvinyl alcohol is not sufficiently soluble.

Accordingly, partially hydrolyzed polyvinyl alcohol having a degree of hydrolysis of from about 79% to about 95%, preferably from about 85% to 90%, especially preferably from about 86% to 89% is used as the water soluble polyvinyl alcohol component of the polymer blend.

The polyvinyl alcohol should have a molecular weight sufficiently high to render it capable of forming a coherent self-supporting film but not so high that it does not dissolve or that it forms a gel when added to water. To this end, the polyvinyl alcohol is selected with a molecular weight (weight average) in the range of from about 10,000 to about 50,000, preferably from about 20,000 to about 40,000, and more preferably from about 22,000 to 31,000.

The other essential component of the polymer blend is a homopolymer of N-vinyl pyrrolidone. Again, any of the commercially available forms of polyvinyl pyrrolidone have been found to be compatible with and form homogeneous solutions and blends with polyvinyl alcohol.

To achieve the desired degree of solubility in cold and hot water, the rate of solubility and resistance to aging, the polyvinyl pyrrolidone has a molecular weight in the range of from about 10,000 to about 50,000, preferably from about 20,000 to about 50,000, especially from about 30,000 to about 48,000.

The polyvinyl alcohol and polyvinyl pyrrolidone are blended with each other to provide weight ratios (on a dry matter basis) in the range of from about 10:1 to about 1:1, preferably from about 6:1 to about 2:1, more preferably from about 5:1 to 3:1, and especially about 4:1.

The properties of the water soluble films of the invention can be further improved by incorporating any of the known plasticizers for polyvinyl alcohol into the aqueous casting solution. In particular, the glass transition temperature, tg, and brittle temperature, tf, is lowered so that the impact strength of the film, and hence packages produced therefrom, which are subject to low temperatures and humidities are greatly improved. The preferred plasticizers include polymerized glycerol (e.g., Dow Chemical Co.'s Polyglycerol W-80) and glycol ethers, (e.g., tetraethylene glycol). Other suitable plasticizers include, for example, glycerol, diethylene glycol, triethylene glycol, polyethylene glycol, and other ether polyols, triethanolamine, 1,3-butanediol, Carbowax-2000, triethanolamine acetate, ethanol acetamide, as well as the plasticizers mentioned in any of the above-mentioned patents. Mixtures of plasticizers can also be used.

The amount of the plasticizer can vary widely. Generally, the plasticizer will be added to the aqueous casting solution in amounts sufficient to provide about 0.5% to about 5%, preferably about 1% to about 4%, more preferably about 2% to 3% by weight, based on the weight of the entire casting solution. In terms of total polymer (polyvinyl alcohol plus polyvinyl pyrrolidone) content of the water soluble film, the amount of the plasticizer in the film is preferably from about 10% to 30%, more preferably from about 15% to about 25% by weight.

In view of the biodegradability of the polyvinyl alcohol and polyvinyl pyrrolidone components, it is often desirable to include one or more biocides, especially bactericides, in the water soluble film. Generally, the biocide will be the last component added to the casting solution. The amount of biocide is not particularly critical and will depend on the amounts of the polymers and on the particular biocide. Generally, amounts up to about 0.1%, based on the amount of the polyvinyl alcohol solids will be sufficient.

Any conventional bactericide can be selected so long as it is compatible with the polymer blend. The biocide should be non-toxic to humans, especially for those applications of the water soluble films, such as packaging films for detergents and other cleaning agents, or for foodstuffs, where there is a possibility that the components of the film, when dissolved, will come into contact, directly or indirectly, with the skin, or may even be consumed. Examples of suitable biocides include the quaternary ammonium salts, Alkyl ($C_8$-$C_{18}$) di lower alkyl benzyl ammonium chlorides, Di-isobutyl phenoxy ethoxy ethyl dimethyl benzyl ammonium chloride, monohydrate, Alkyl ($C_9$-$C_{15}$) tolyl methyl trimethyl ammonium chlorides, Cetyl pyridinium chloride or bromide, N-myristyl benzyl-N,N-diethyl-N-ethanol ammonium chloride, Alkyl ($C_8$-$C_{18}$)dimethyl ethyl benzyl ammonium chlorides, Lauryl isoquinolinium bromide, Alkenyl dimethyl ethyl ammonium bromides, N(methyl heptyl-colamino-formyl-methyl) pyridinium chloride, Cetyl dimethyl ethyl ammonium bromide, Lauryl pyridinium chloride, Cetyl ethyl dimethyl ammonium bromide, Tridecyl benzyl hydroxy ethyl imidazolinium chloride, Dodecyl acetamido dimethyl benzyl ammonium chloride. Polyalkyl naphthalene methyl pyridinium chloride, Dialkyl dimethyl ammonium chloride, Dialkyl dimethyl ammonium bromide, Myristamido propyldimethyl benzyl ammonium chloride, Myristyl-Y-picolinium chloride, N-N-N'-N'-tetramethyl-N-N'-didodecyl-$\beta$-hydroxy-propylene diammonium bromide, benzalkonium quaternary compounds, halogenated salicylonilides, hexachlorphene, neomycin sulfate, bithionol, 3,4,4'-trichlorocarbanilide, and the like.

Although not wishing to be bound by any particular theory, it is believed that the improved aging characteristics of the water soluble films of this invention result from the high molecular compatibility between the polyvinyl alcohol and polyvinyl pyrrolidone, and more particularly, because of the ability of the polyvinyl pyrrolidone to interfere with the inherent tendency of the partially hydrolyzed polyvinyl alcohol to undergo further hydrolysis (e.g., 96% or more) and become insoluble. This protective mechanism appears to be a preferential H-bonding of the polyvinyl alcohol with carbonyl sites from the polyvinyl pyrrolidone. This is made possible because of the compatibility of the two polymers, viz. the polyvinyl pyrrolidone fits into the molecular lattice of the polyvinyl alcohol and, thus, prevents further crystallization by spoiling the molecular symmetry or perfection.

On a molecular scale, hydrolysis of partially hydrolyzed polyvinyl alcohol can be represented by the following formula:

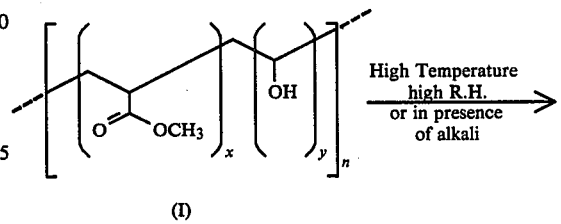

(I)

x ≃ 5 to 20 mole %
y ≃ 80 to 95 mole %
y¹ ≃ 96 to >99 mole %.

The mechanism of aging stabilization against further hydrolysis can be represented by the following formula:

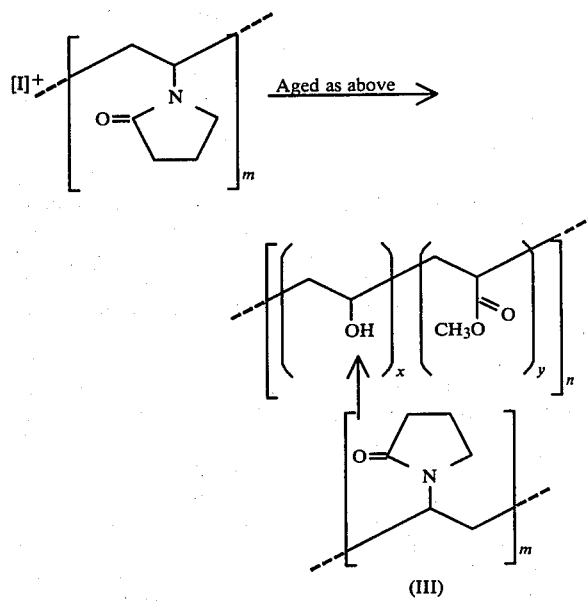

where formula (III) shows the interference H-bonding between the polyvinyl pyrrolidone and polyvinyl alcohol. The hydrogen bonded structure (III) interferes sterically and electronically with continuing hydrolysis (as well as internal H-bonding) of the polyvinyl alcohol (I) which thereby prevents the conformational perfection of structure (I-A) which would result in high order crystallinity and insolubilization.

In any case, by whatever mechanism, it has been found that the water soluble films of this invention exhibit superior resistance to aging in low temperature/low humidity and high temperature/high humidity conditions, i.e., remain soluble in cold water, do not become soft or tacky, retain high mechanical strength, etc., as compared to conventional water soluble films based on polyvinyl alcohol.

The water soluble films are heat sealable and are readily formed into packages. For instance, two sheets of water soluble films can be placed one over the other and heat sealed along three edges. The dry, water-soluble commodity, e.g., dry laundry powder, is loaded into the package through the remaining open edge which can then also be heat sealed. It is a particular advantage of the invention that even after storage of the water soluble films for extended periods at low temperature/low humidity and/or high temperature/high humidity conditions, the heat sealability of the films are not adversely effected. The elasticity, strength, clarity, as well as high rate of solubility, even in ice cold water conditions, of the films also withstands any adverse effects from the ambient conditions.

The invention will now be illustrated by specific embodiments in the following non-limiting examples, in which all "parts" and "percents" are "by weight" unless otherwise noted.

EXAMPLE 1

An aqueous casting solution is prepared by first forming a 10.0% solids solution of polyvinyl alcohol (88% hydrolyzed, molecular weight in the range of 22,000 to 31,000) by forming a dispersion of the polymer in cold water, adding about 0.1% of nonionic anti-foam agent (Triton CF-32) to the dispersion, and then solubilizing by heating the dispersion to a temperature of 180° F. to 220° F. with vigorous stirring. To eighty parts of the polyvinyl alcohol solution (10% solids), 2.5 parts of tetraethylene glycol plasticizer is added. 6.65 parts of a commercially available aqueous solution (30% solids) of polyvinyl pyrrolidone (PVP K-30, molecular weight 40,000) is added to the plasticized polyvinyl alcohol solution. The casting solution is adjusted to 100 parts with water (10.85 parts water) to form an aqueous casting solution containing 12.5 parts (12.5%) of active ingredients, i.e., polymers and plasticizer. To this casting solution, about 0.5% biocide/perservative (GIVGARD DXN, a product of Givaudan Corp.), based on the amount of polyvinyl alcohol solids, is added. All ingredients are blended using vigorous agitation to assure homogeneity.

From the aqueous casting solution, films are prepared with both a 4-inch and 8-inch Gardener film casting knife using a blade clearance of 22-24 mils. The casting solution is deposited on either Mylar polyester or plasticized polyvinyl chloride sheets as the casting surface. After drying in air overnight, clear films are obtained having a thickness of 0.0015 inches.

EXAMPLE 2

Example 1 is repeated except that 3.35 parts of polyglycerol (75% solids) is used as plasticizer in place of 2.5 parts of tetraethylene glycol and the amount of water is adjusted from 10.85 parts to 10.0 parts to again give a casting solution with 12.5% of active solids.

What I claim is:

1. A water soluble coherent self-supporting film comprising a uniform mixture of water soluble polyvinyl alcohol, namely 79–95% hydrolyzed polyvinylacetate, and polyvinyl pyrrolidone wherein both of said polymers have weight average molecular weights in the range of about 10,000 to 50,000, the weight ratio of polyvinyl alcohol to polyvinyl pyrrolidone being in the range of from 10:1 to about 1:1.

2. The water soluble film of claim 1 wherein the weight ratio is about 4:1.

3. The water soluble film of claim 1 wherein the polyvinyl alcohol has a degree of hydrolysis in the range of from about 85% to about 90% and a weight average molecular weight in the range of from about 20,000 to about 40,000 and the polyvinyl pyrrolidone has a molecular weight in the range of from about 20,000 to about 50,000.

4. The water soluble film of claim 1 wherein the polyvinyl alcohol has a degree of hydrolysis in the range of from about 86 to 89% and a weight average molecular weight in the range of from about 22,000 to 31,000 and the polyvinyl pyrrolidone has a molecular weight in the range of from about 30,000 to about 45,000.

5. The water soluble film of claim 1 which further comprises a plasticizer for the polyvinyl alcohol component.

6. The water soluble film of claim 5 in which the plasticizer is tetraethylene glycol or polyglycerol.

* * * * *